United States Patent
Kuroda et al.

(10) Patent No.: US 6,501,904 B1
(45) Date of Patent: Dec. 31, 2002

(54) VIDEO SIGNAL RECORDING AND/OR REPRODUCING APPARATUS

(75) Inventors: Tokuji Kuroda, Ibaraki (JP); Tatsushi Bannai, Sakai (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/111,415

(22) Filed: Jul. 8, 1998

(30) Foreign Application Priority Data

Jul. 8, 1997 (JP) .............................................. 9-182016

(51) Int. Cl.[7] .............................. H04N 7/26; H04N 7/08; H04N 7/01

(52) U.S. Cl. ........................ 386/109; 386/92; 386/131

(58) Field of Search .......................... 386/46, 109, 111, 386/112, 27, 33, 35, 37, 38, 40, 68, 67, 92, 95, 105, 106, 117, 120, 123, 124, 129, 131; H04N 7/26, 7/08, 7/01

(56) References Cited

U.S. PATENT DOCUMENTS

| | | | | |
|---|---|---|---|---|
| 5,335,116 A | * | 8/1994 | Onishi et al. | |
| 5,418,658 A | * | 5/1995 | Kwon | |
| 5,576,758 A | * | 11/1996 | Arai et al. | |

FOREIGN PATENT DOCUMENTS

| | | |
|---|---|---|
| JP | 3-108975 | 5/1991 |
| JP | 5-328396 | 12/1993 |
| JP | 6-12789 | 1/1994 |
| JP | 6-139705 | 5/1994 |
| JP | 7-262691 | 10/1995 |

* cited by examiner

*Primary Examiner*—Robert Chevalier
(74) *Attorney, Agent, or Firm*—RatnerPrestia

(57) ABSTRACT

A video-signal-recording apparatus compresses video signals having different formats, and records the signals. The apparatus comprises a recognition means for recognizing input video formats, compression means for changing compression rates depending on the format recognition signal, and record means for compounding the format recognition signal and an output from the compression means. The apparatus records the video signals having different formats on a recording medium sequentially without any seams.

39 Claims, 21 Drawing Sheets

| | MSB | | | | | LSB |
|---|---|---|---|---|---|---|
| PC0 | 60h | | | | | |
| PC1 | TENS of TV CHANNEL | | UNITS of TV CHANNEL | | | |
| PC2 | B/W | EN | CLF | HUNDREDS of TV CHANNEL | | |
| PC3 | SOURCE CODE | | 50/60 | STYPE | | |
| PC4 | TUNER CATEGORY | | | | | |

Fig. 8

| | MSB | | | | | | | LSB |
|---|---|---|---|---|---|---|---|---|
| PC0 | 60h | | | | | | | |
| PC1 | Res | | | | | | | |
| PC2 | | | B/W | EN | CLP | Res | | |
| PC3 | Res | | | | 50/60 | STYPE | | |
| PC4 | VISC | | | | | | | |

Res : Reserved bit

Fig. 11

VIDEO SIGNAL RECORDING AND/OR REPRODUCING APPARATUS

FILED OF THE INVENTION

The present invention relates to a video signal recording and reproducing apparatus that compresses video signals having different formats with a high efficiency, and records as well as reproduces the compressed video signals.

BACKGROUND OF THE INVENTION

Recently, several new broadcasting systems, such as HDTV (high definition television), ATV (advanced television), etc. have been developed in the engineering field of broadcasting industry, and some of the new systems are now in operation.

On the other hand, various systems are proposed to be the next generation broadcasting system, e.g., a progressive signal method, in other words, a 480p signal method, which is converted from the interlace signal method of NTSC system where 525 scanning lines are employed. Meanwhile, the 480p signal method handles 525 scanning lines in the progressive method; however, a number of active lines are 480, thus the system is named for this number. The conventional interlace system is called "480i" in order to distinguish from the progressive method. The 480p signal method is now prescribed as the DTV (digital television) standard of the U.S.

The 480p signal of progressive signal method is described hereinafter.

FIG. 16 is a schematic diagram depicting signal modes of interlace and progressive method. By the interlace mode, 30 frames of picture data are produced per second, one picture data (one frame) is scanned with every other scanning line of 525 lines, thus 60 picture data (field) per second, each frame scanned with 262.5 lines, are transmitted. A digital studio standard employing the interlace mode is prescribed in Recommendation ITU-R.601-3, of which sampling frequency is, luminance signal: 13.5 MHz, color difference signal: 6.75 MHz. This "4:2:2 signal" is referred to "4:2:2-i signal" hereinafter to identify that this signal is in the interlace mode.

The progressive method, on the other hand, produces 60 picture data (frame) per second, and one picture data is scanned by 525 scanning lines (including 480 active lines) without interlacing. The progressive signal, of which picture is formed with 525 scanning lines, is digitized by a "8:4:4 signal" format, i.e., doubled sampling frequency of the digital studio standard in the interlace mode. The sampling frequency of the progressive signal is thus, luminance signal: 27 MHz, color difference signal: 13.5 MHz., which is twice as much as that of the "4:2:2 signal". The "8:4:4 signal" is now studied to divide into a main signal and a sub-signal for transmitting, i.e., the main signal comprising one luminance signal and two color difference signals, and the sub-signal comprising also one luminance signal and two color difference signal so that the sub-signal interpolates the main signal. The "8:4:4 signal" is thus divided into the main and sub signals which are assigned to every other scanning line respectively. The main signal and sub signal of this method are an independent interlace signal having 525 scanning lines per frame, and are the same as the "4:2:2 signal". The coupled main signal and sub signal is hereinafter referred to "4:2:2:4:2:2 signal" or "4:2:2p signal".

FIG. 18 depicts a sampling structure of the "4:2:2p signal" on a screen. As shown in FIG. 18, a video signal is divided into the main signal and sub signal in both an even frame and an odd frame. The main signals and sub signals are alternately arranged on vertical and horizontal lines in temporal-spatial wise.

When the "8:4:4 signal" or "4:2:2p signal" is transmitted, the color difference signal of "8:4:4 signal" undergoes, e.g., a vertical filter as shown in FIG. 17 in vertical direction in order to limit its bandwidth before transmitting the color difference signal in each line, for the color difference signal carries less information than the luminance signal does, therefore the human visual property does not sense deterioration of the color difference signal. In FIG. 17, the filter comprises 1H delay line 120, 121 delaying a signal for one horizontal scanning period, a multiplier 122, 124 and an adder 123. The numbers printed in the boxes representing the multipliers 122 and 124 in FIG. 17 are coefficients of multiplication. The color difference signal is limited in its band by e.g., the vertical filter as shown in FIG. 17, then the signals are decimated in each line, then the color difference signal only on the main signal side are transmitted, while that on the sub signal side is not transmitted.

The above transmitted signal is called "4:2:2:4:0:0 signal" or "4:2:0p" signal because the sub signal does not carry the color difference signal. The "4:2:0p signal" is prescribed as SMPTE294M standard. When the progressive signal is converted into the "4:2:0p signal" in transmission, recording or playing back, the transmission band can be effectively reduced without deteriorating a visual quality of the video signal.

On the other hand, the color difference signal decimated on the sub-signal side can be reproduced by providing the main signal with an interpolation filter as shown in FIG. 19 or 20. FIG. 20 shows the easiest way for the reproduction. In FIG. 19, the filter comprises 1H delay lines 130, 131 and 132 delaying a signal for one horizontal scanning period respectively, multipliers 133, 134, 135, 136 and 138, and an adder 137. The numbers printed in the boxes representing the multipliers are coefficients of multiplication. In FIG. 20, the filter comprises 1H delay line 140 active in one horizontal scanning period, an adder 141 and a multiplier 142. The number printed in the box 142 representing the multiplier is a coefficient of multiplication. Since the color difference signal on the sub-signal side can be reproduced by the filter shown in FIG. 19 or 20, the "4:2:0p signal" can be converted into the "4:2:2p signal", further, the "4:2:2p signal" can be converted with ease into the "4:2:2-i signal" by adding the main and sub signals and dividing 2 into the addition result, as FIG. 21 shows an example. In FIG. 21, a filter comprises an adder 150 and a multiplier 151. The number printed in the box of multiplier 151 is a coefficient of multiplication.

Besides the "480p signal" method, various methods are proposed in HDTV (high definition television) system and other systems aiming for the higher resolution than that of the present system. For instance, 1125i/1035i (1125 scanning lines including 1035 active lines), 1125i/1080i method in the interlace system, and 750p/720p (750 scanning lines including 720 active lines) in the progressive signal method of HDTV system are proposed.

Various proposals of TV systems accompany the developing of hardware corresponding to the systems such as acquisition devices, equipment for studios. The next generation broadcasting system; however, has just undergone a test operation, therefore, materials produced by the acquisition devices are converted into the present television system to be on-air. For instance, a program is produced by HDTV cameras and VCRs, and the program is on-air through the satellite broadcasting as HDTV, and also the program is converted into the present television system and on-air through the terrestrial broadcasting.

It sometimes happens that a program is produced using devices and equipment corresponding to various broadcasting methods, e.g., a program is produced by combined hardware including devices for high resolution television such as HDTV, 480p and other devices for the present television system, and the program thus produced is on-air through the present broadcasting system.

In such a case, the program must be undergone the process shown in FIG. 15 before on-air.

The conventional method shown in FIG. 15 is now detailed.

In FIG. 15, a first VCR 100 is used in "480i signal" system of interlace mode, and reproduces the "4:2:2-i signal" where a sampling frequency ratio of luminance signal vs. color difference signals is 4:2:2. A second VCR 101 is used in "480p signal" system of progressive signal, and reproduces "4:2:0p signal". A third VCR 102 reproduces HD signals containing e.g., 1125 scanning lines which includes 1080 effective lines. A fourth VCR 106 records and reproduces video signals formatted in "4:2:2-i signal" of the present television system. All the VCRs handle compressed video signals.

The first VCR 100 reproduces and outputs "4:2:2 signal 107". The second VCR 101 reproduces "4:2:0p signal", which undergoes a scanning line converter 103 which is formed by a simple filter as shown in FIG. 21, and produces "4:2:2-i signal 110". The third VCR 102 reproduces a HD signal 109, which undergoes a format converter 104 to be converted into "4:2:2-i signal". The format converter 104, in this case, is called a "down converter", and has filters both in vertical and horizontal directions on the screen. The format converter 104 converts a number of scanning lines and samples per line to produce "4:2:2-i signal 111". A switcher 105 selects one of input signals 107, 110 and 111 of "4:2:2-i" system, and outputs the selected signal as an output signal 112 to the fourth VCR 106, which edits signals including the selected signal on its tape to produce a program.

In FIG. 15, if additional device of another system is used, the corresponding VCR as well as converter must be prepared, and signals are edited on the tape.

In the above conventional process, e.g., when a picture of "4:2:2-i signal" is produced by combining a picture of "4:2:0p signal" and a picture of "4:2:2-i signal", the "4:2:0p signal" is firstly converted into the "4:2:2-i signal", then secondly compressed again for being edited on the tape. The repeating signal compression and decompression results in deteriorating a picture quality. Further, necessary times for decoding, line conversion and format conversion differ depending on formats of original picture as well as converted picture, it is thus impossible to record the signals in the fourth VCR on real time base. There are still other problems as follows in addition to the above problems:

1. Three VCRs in total are necessary, i.e., one for reproducing the "4:2:0p signal", one for reproducing the "4:2:2-i signal" and the other for recording the "4:2:2-i signal". Further a line converter for converting the "4:2:0p signal" into the "4:2:2-i signal" is required. These devices require much of labor and cost.

2. Editing process, such as insertion and assembly, does not allow any seams in a chain of signals and yet consumes a large number of times.

SUMMARY OF THE INVENTION

The present invention aims to address the above problems and provide a recording and reproducing apparatus which can record and reproduce video signals of different numbers of scanning lines and resolutions with no seams between video signals and without deteriorating picture quality.

In order to achieve the above goals, the present invention compresses a various of video signals, which have different numbers of scanning lines and resolutions, into signals having different bit-rates lower than the maximum bit-rate so that a recording and reproducing apparatus can process. The video signals can be thus continuously recorded and reproduced.

According to the first invention, a video signal recording apparatus comprises the following elements:

(a) compressing means which receives at least two kinds of video format signals, recognizes the formats and compress the signals instantly responding to respective information quantity of the video signals, (b) recording means which records (1) the compressed signals and (2) format recognition signals for recognizing a format of the compressed signals without seams, on at least one helical track formed on a magnetic tape.

According to the second invention, a video signal recording apparatus comprises the following element:

Recording means which receives two or more different kinds of compressed video signals, and records (1) the compressed signals and (2) format recognition signals for recognizing a format of the compressed signals with no seams, on at least one helical track formed on a magnetic tape.

According to the third invention, a video signal reproducing apparatus comprises the following elements:

(a) reproduction means for reproducing signals from the magnetic tape in which the compressed video signals in different formats are recorded without seams on at least one track, (b) decompressing means for (1) recognizing formats of the reproduced signals using the format recognition signals tapped off from the reproduction means, (2) changing a decompression rate instantly responding to the format recognized, and (3) decompressing the reproduced signals into respective original formats with no seams, and (c) conversion means for converting the decoded video signals into another format.

The recording means and reproducing means of the present invention can thus realize to record and reproduce video signals continuously regardless of the formats of the video signals. As a result, video signals having respective numbers of scanning lines and resolutions can be recorded seamlessly on an identical magnetic tape. When producing a program with different video signals having respective numbers of scanning lines and resolutions, production staff are not requested to prepare VCRs for reproduction, conversion means of scanning lines or format, and VCRs for recording, i.e., all of the devices corresponding to respective video signals, therefore, the present invention can significantly save time and labor for producing a program, further the present invention can prevent the picture quality from degrading due to repetitive conversions of scanning lines as well as repetitive signal compression.

The present invention also ensures that no disturbance or no seam is observed when a magnetic tape containing the different video signals having respective numbers of scanning lines and resolutions is played back.

BRIEF DESCRIPTION OF THE DRAWINGS

FIG. 8 depicts a structure of SOURCE PACK.

FIG. 11 depicts a structure of SOURCE PACK included in VAUX section of a compressed interface.

DETAILED DESCRIPTION OF THE PREFERRED EMBODIMENTS

The exemplary embodiments of the present invention are described by referring to the attached drawings. Each embodiment employs DVCPRO format which is disclosed as a SMPTE 306M and 307M standard.

Exemplary Embodiment 1

Figure 1:
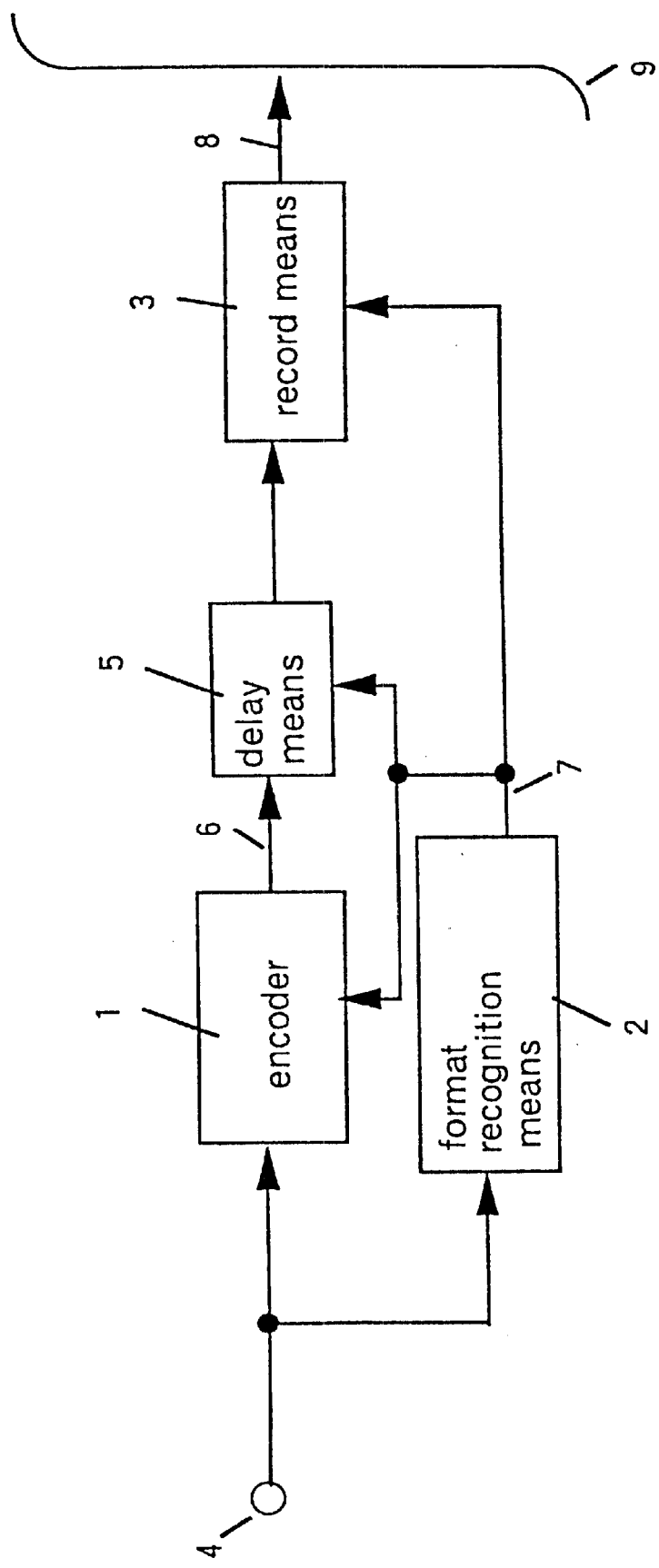
FIG. 1 is a block diagram depicting a recording and reproducing apparatus used in the first exemplary embodiment of the present invention.

FIG. 1 is a block diagram depicting a recording and reproducing apparatus used in the first exemplary embodiment of the present invention. In FIG. 1, an input terminal 4 receives different video signals having respective numbers of scanning lines and resolutions. Assume that the input terminal 4 receive interlace signals (4:2:2-i signal) or progressive signals (4:2:0p signal). Input signal recognition means 2 recognizes automatically a format of video signals received at the input terminal 4, and outputs a format recognition signal 7.

Figure 2:
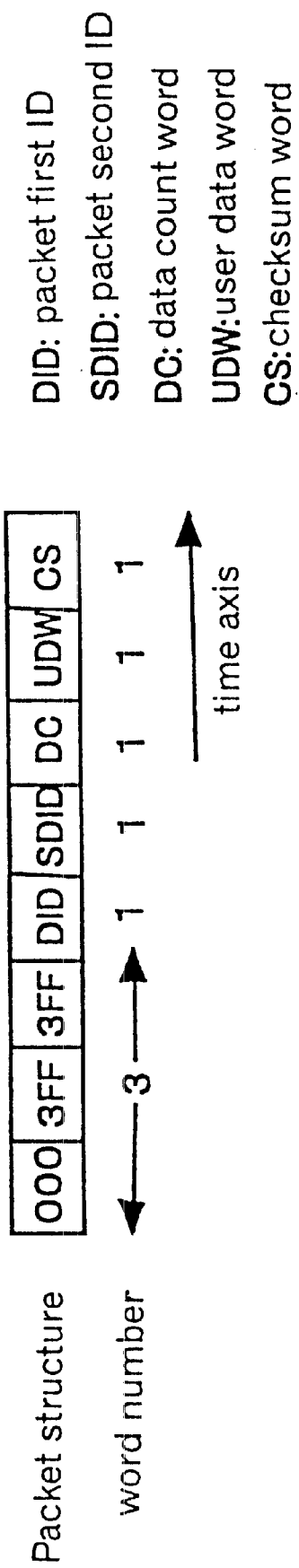
FIG. 2 depicts a control packet including format recognizing information which is included in horizontal or vertical blanking time of the video signal fed through a digital interface.

An operation of the input format recognition means is described here. FIG. 2 depicts a control packet including format recognizing information which is included in horizontal or vertical blanking time of the video signal fed through a digital interface. In the control packet, 10 bits are treated as one word. The control packet comprises the following words, which are transmitted in a packet mode sequentially in the following order:

(1) a header including three words, i.e., 000h, 3FFh, 3FFh ("h" indicates hexadecimal),
(2) DID indicating the first identification of the packet,
(3) SDID indicating the second identification of the packet,
(4) DC indicating a number of words of UDW,
(5) UDW indicating user data,
(6) CS indicating checksum of all the words except the header.

Figure 3:
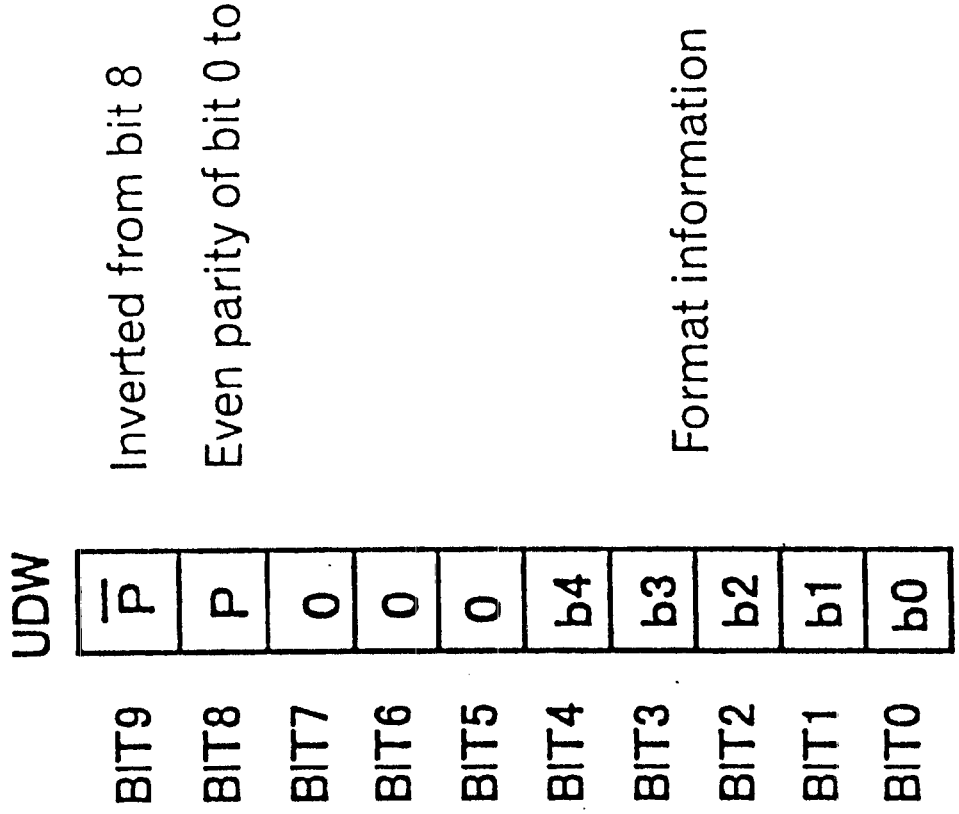
FIG. 3 depicts a structure of UDW (user data word).

In FIG. 2, UDW is used for actual data, and a structure of UDW is depicted in FIG. 3, where the format recognizing information is inserted in the five bits, namely BIT0–BIT4. The input format recognition means 2 detects control packets, and further detects automatically the formats of the input video signals using the format recognizing information included in the control packet. In the encoder, a compression rate for video signals is automatically determined using the format recognition signal 7 obtained from the input format recognition means 2, whereby the "4:2:2-i signal" fed into the input terminal 4 is compressed. As a result, information quantity of the video signals is compressed. In the encoder 1, the video signals undergo blocking, shuffling, DCT (discrete cosine transform), quantization and other processes. When an effective bit rate of the input signal (4:2:2-i signal) at the input terminal 4 is 166 Mbps, the encoder 1 taps off the output signal 6 with 50 Mbps bit rate.

In the same manner, when the input terminal 4 receives "4:2:0p signal", the encoder 1 compresses the input signal through changing automatically the compression rate for video signals by using the format recognition signal 7 tapped off from the input format recognition means 2, whereby the information quantity of the video signals can be compressed. When an effective bit rate of the input signal (4:2:2-p signal) at the input terminal 4 is 249 Mbps, the encoder 1 taps off the output signal 6 with 50 Mbps bit rate.

The encoder 1 outputs signals into delay means 5. In the above two cases, the encoder 1 produces different delay times, the delay means 5 thus gives appropriate delay times to respective cases in order to adjust a timing.

In record means 3, the compressed signals having up to 50 Mbps bit rates undergo recording processes such as adding error correcting code, modulation, and inserting stuffing bits, then the recording means 3 taps off output signals 8 with an identical bit rate of 84 Mbps. Therefore, even a turning point between different formats, the video signals can be recorded seamlessly on a magnetic tape 9.

Figure 4:
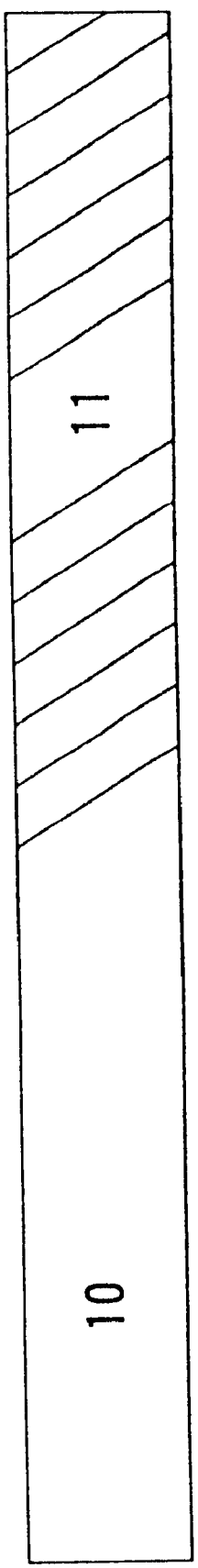
FIG. 4 depicts an example of a recording pattern on a magnetic tape used in the recording and reproducing apparatus of the present invention.
Figure 5:
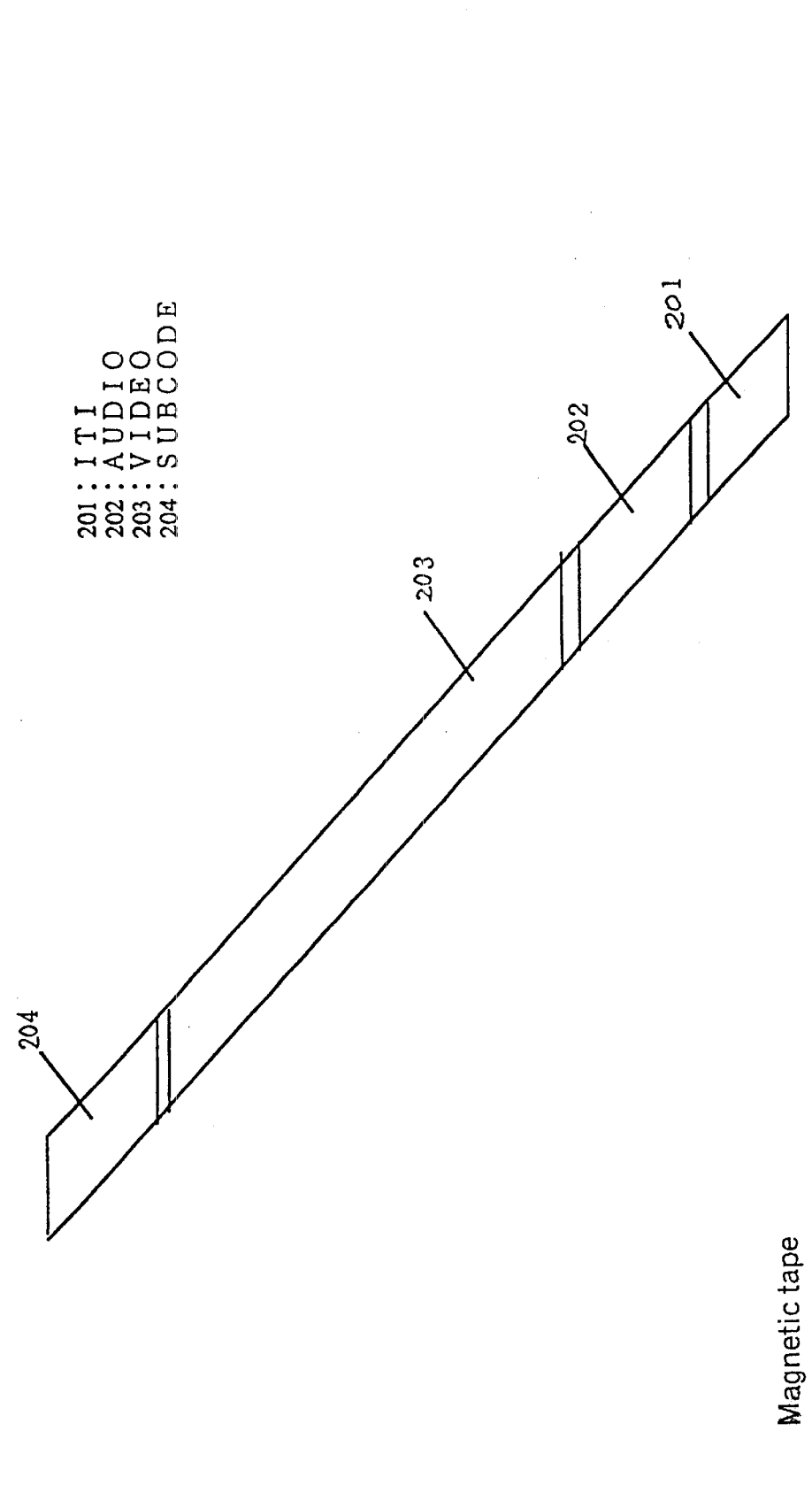
FIG. 5 depicts a format of recorded signals on the tape.
Figure 6:
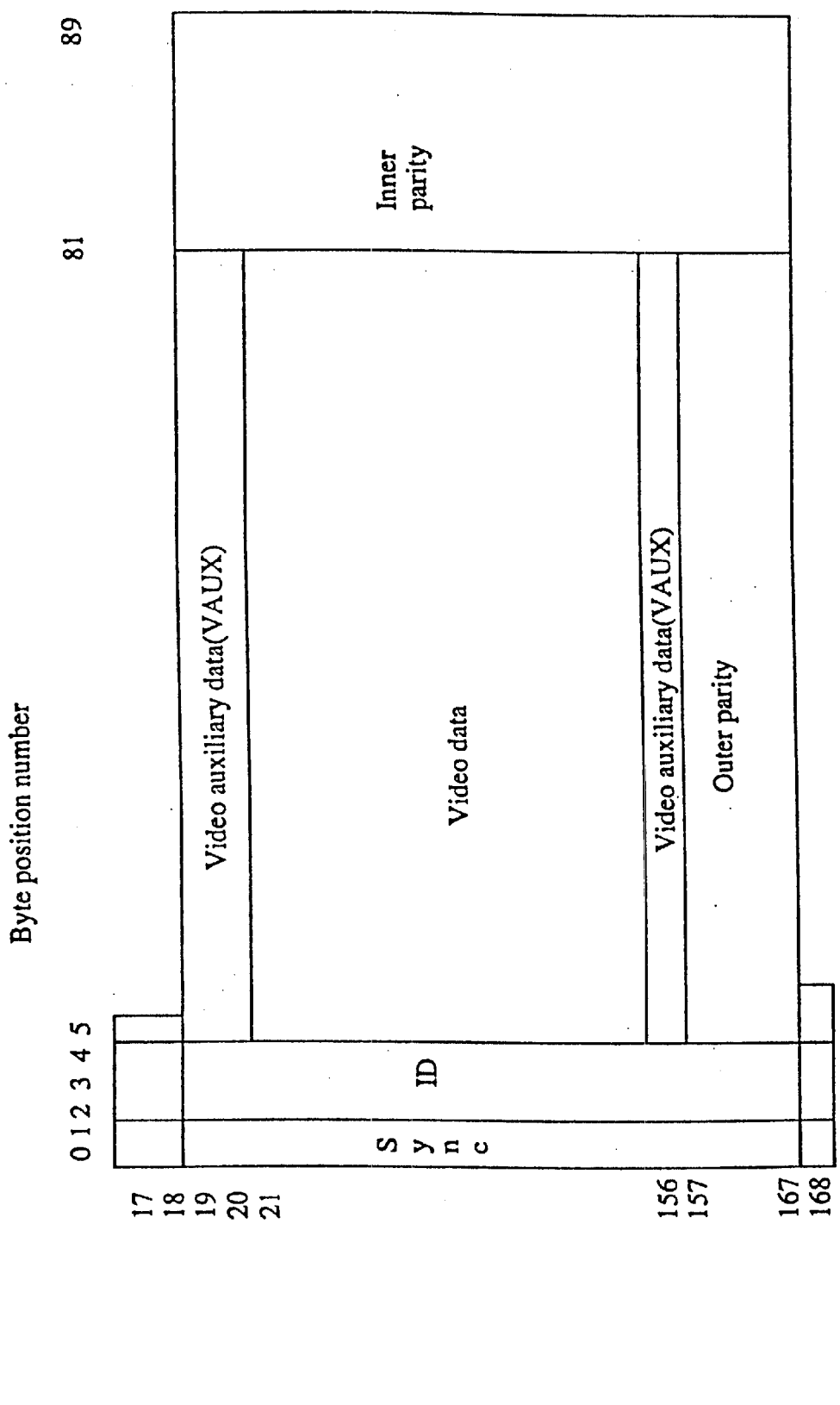
FIG. 6 depicts a structure of a Sync. block of a video region of the recorded signals on the tape.

FIG. 4 depicts an example of a recording pattern on the magnetic tape 9 used in the recording and reproducing apparatus depicted in FIG. 1 of the present invention. In FIG. 4, for instance, a recorded signal 10 (or a recorded region) is 4:2:2-i signal, and a recorded signal 11 is 4:2:0p signal. The format recognition signal 7 tapped off from the input format recognition means 2 is also recorded together with video signals on the magnetic tape 9 in order to recognize video formats of reproduced signals in the play back mode. FIG. 5 depicts a format of recorded signals on the tape. The format indicates a recorded pattern of DVCPRO VCR disclosed as the SMPTE 306M, 307M standard. As shown in FIG. 5, the tape contains the following regions along a head scanning direction in this order: ITI region 201, AUDIO region 202, VIDEO region 203, SUB-CODE region 204. In the VIDEO region, video signals are recorded based on a SYNC BLOCK having a length of 90 bytes. FIG. 6 depicts a structure of the SYNC BLOCK of recorded signal in the VIDEO region.

The vertical axis of FIG. 6 indicates numbers of the SYNC BLOCK. The numbers indicate an order of the SYNC BLOCK along the head scanning direction. The horizontal axis indicates position numbers of bytes of each SYNC BLOCK having a length of 90 bytes. As FIG. 6 shows, each SYNC BLOCK has 90 bytes in total, and comprises, (1) a SYNC section having 2 bytes for establishing synchronization, (2) ID section having 3 bytes and including TRACK numbers, SYNC BLOCK numbers, etc., (3) Video Data section having 77 bytes and (4) Inner Parity having 8 bytes.

Figure 7:
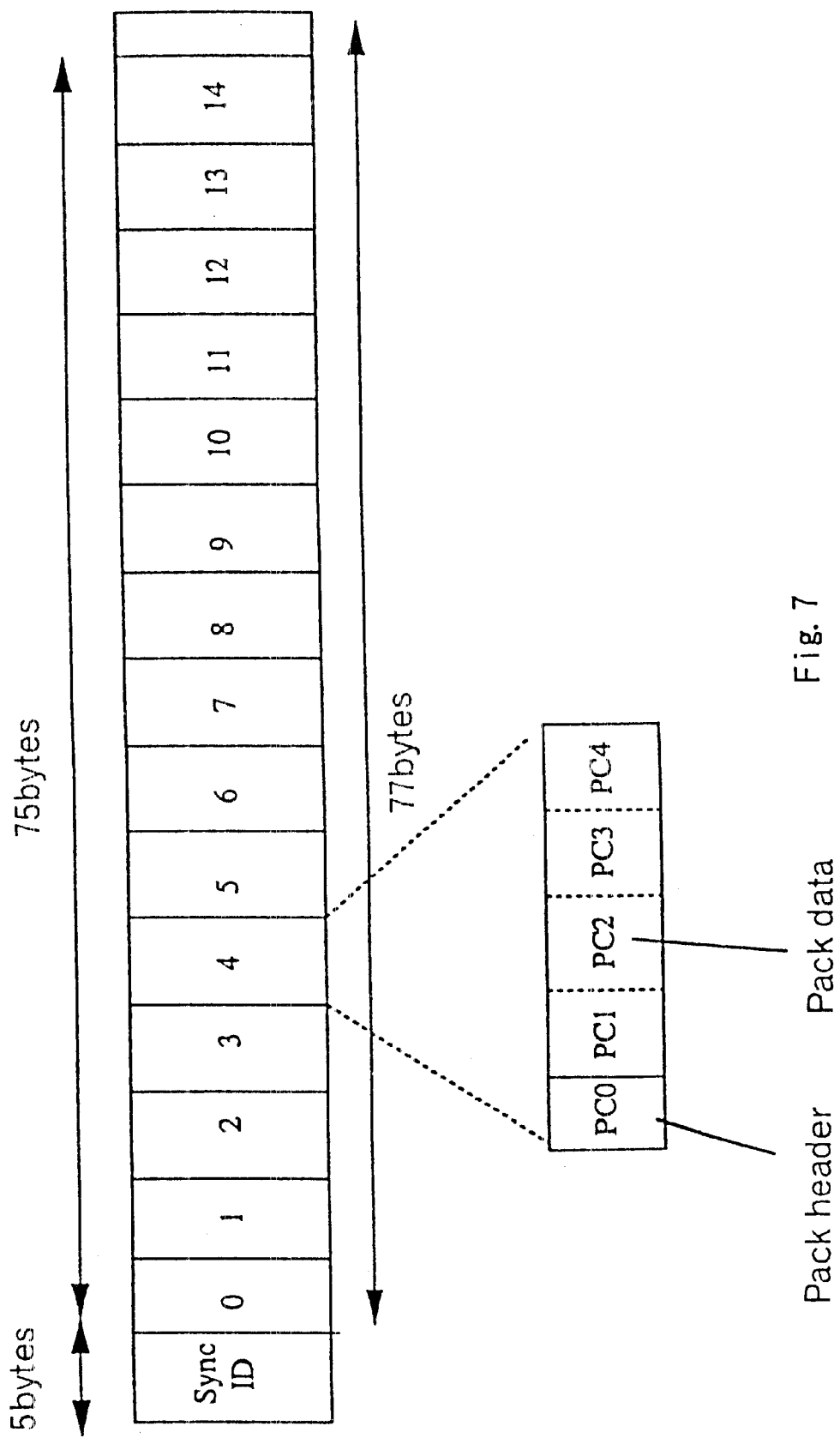
FIG. 7 depicts a structure of the Sync. block of VAUX section.

FIG. 6 depicts that Video Auxiliary Data (VAUX) are recorded in the SYNC BLOCK Nos. 19, 20 and 156. As such, control data other than video signals are recorded in the VAUX section. The outer parity are recorded in the SYNC BLOCK Nos. 157–167. The format recognizing information is recorded in the VAUX section shown in FIG. 6. FIG. 7 depicts a structure of the SYNC BLOCK in the VAUX section. Each SYNC BLOCK of the VAUX section can record maximum 15 PACKS of which data structure is 8-bit/byte, and 5 bytes/unit.

The PACK has five bytes that are assigned to: PC0, pack header (one byte) which identifies a kind of the PACK, and PC1–PC4, Pack data (four bytes) which contain control information.

The format recognizing information is recorded in SOURCE PACK, one of the PACKs, shown in FIG. 8. The SOURCE PACK contains information about the video signals such as, field frequencies of video signals, color frame information, and channel information on television besides the format recognizing information. In FIG. 8, 60h are recorded in PC0 as a pack header of the SOURCE PACK. PC1 through PC4 contain the information about the video signals, and the format recognizing information is recorded in STYPE section of PC3, namely, in total 5 bits from LSB bit to LSB+4 bit.

According to the first exemplary embodiment as described above, formats of input signals are automatically recognized when different video signals, which have respective numbers of scanning lines and resolutions, are given to the input terminal. The encoder 1 changes compression rates of video signals instantly thereby compresses the input signals into less than the bit rate of the recording signals, then the signals are recorded on the magnetic tape by recording means 3. As a result, the video signals having respective numbers of scanning lines and resolutions can be recorded seamlessly on the identical magnetic tape. When a program is produced using such video signals as above, it is not required to prepare respective VCRs, converters of scanning lines or format converters, and VCRs for recording. It is proved that the present invention contributes to labor and time savings when programs are produced. At the same time, there is no need for concern about degrading the picture quality due to repeated compressions after converting a number of scanning lines.

Since the different video signals having respective numbers of scanning lines and resolutions are recorded seamlessly on the identical magnetic tape, formats of recording signals can be changed depending on the input signals. For instance, a camera of progressive method and another camera of interlace method are prepared, and the recording signals can be changed depending on the characteristics of subjects, e.g., a video in excited motion is recorded on the magnetic tape as progressive signals, and a subject having less motion such as a still picture is recorded on the tape as interlace signals which does not require a high compression rate, whereby video signals containing quality pictures as well as high dynamic resolutions can be recorded.

In this embodiment, the compression rates are instantly changed by the encoder, whereby the video signals having quality pictures as well as high dynamic resolutions can be recorded on the magnetic tape; however, a various of encoder are prepared corresponding to different kinds of input signals for changing the compressed video signals instantly, and the recording signals thus result.

This embodiment presents the case where 4:2:0p signals and 4:2:2-i signals are fed into the input terminal. When a video signal of the higher resolution, such as an HD signal, is given, the same effect can be obtained through the same process. In such a case, two or more kinds of video signals can be received without any influences.

In this embodiment, the input terminal receives the video signals before the data are compressed; however, when the input terminal received compressed data, the encoder is not needed, which contributes to a significant cost saving. This case is detailed in the following second exemplary embodiment.

Exemplary Embodiment 2

This embodiment describes a picture recording apparatus which is given compressed signals as input signals. A transmission interface, which handles compressed signals in DVCPRO format, maps the compressed signals shown in FIG. 10 on a payload of SMPTE305M standard (SDTI= serial data transport interface), thereby transmitting the signals. This story does not relate to the present invention, the detail is thus omitted here.

Figure 9:
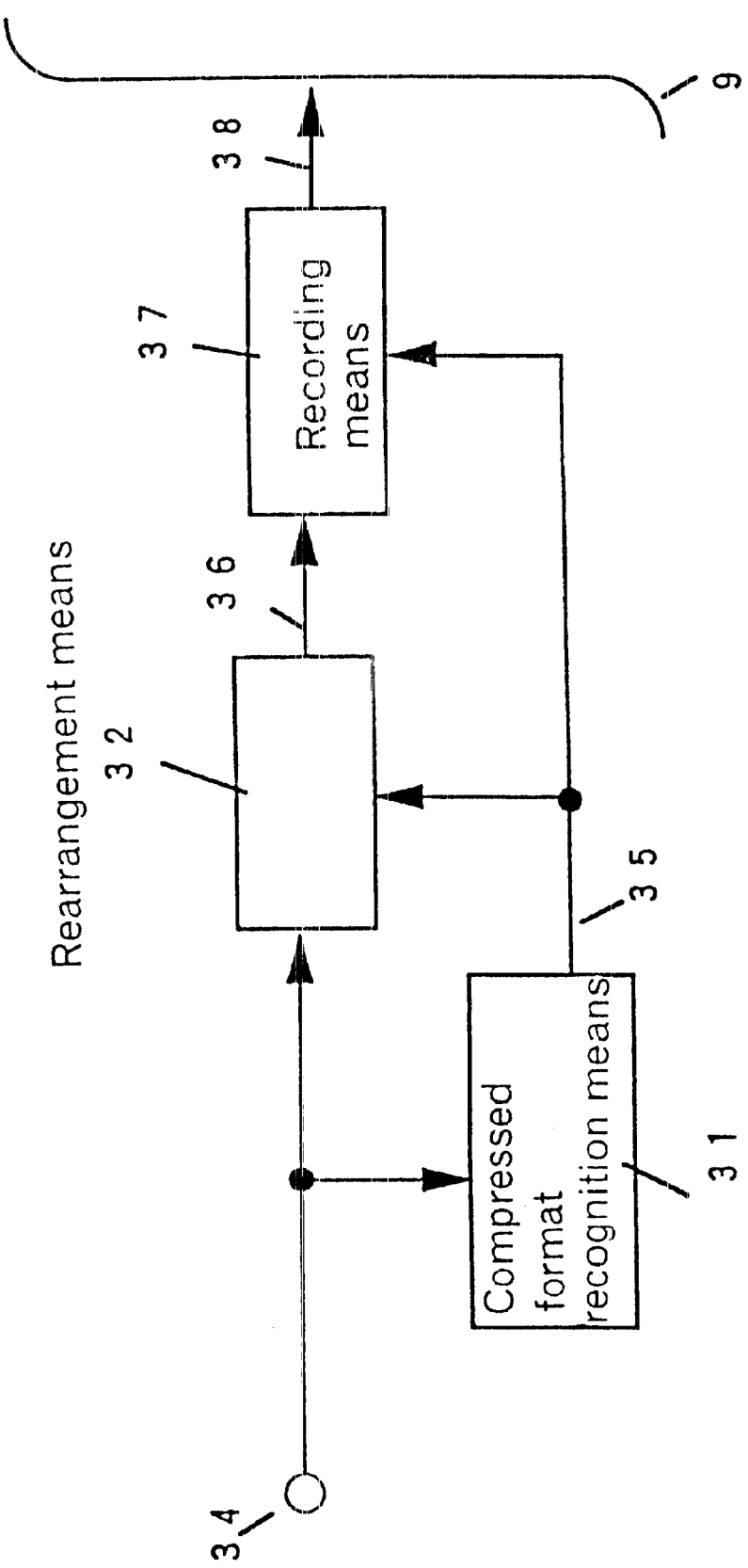
FIG. 9 is a block diagram depicting a recording and reproducing apparatus used in the second exemplary embodiment.
Figure 10:
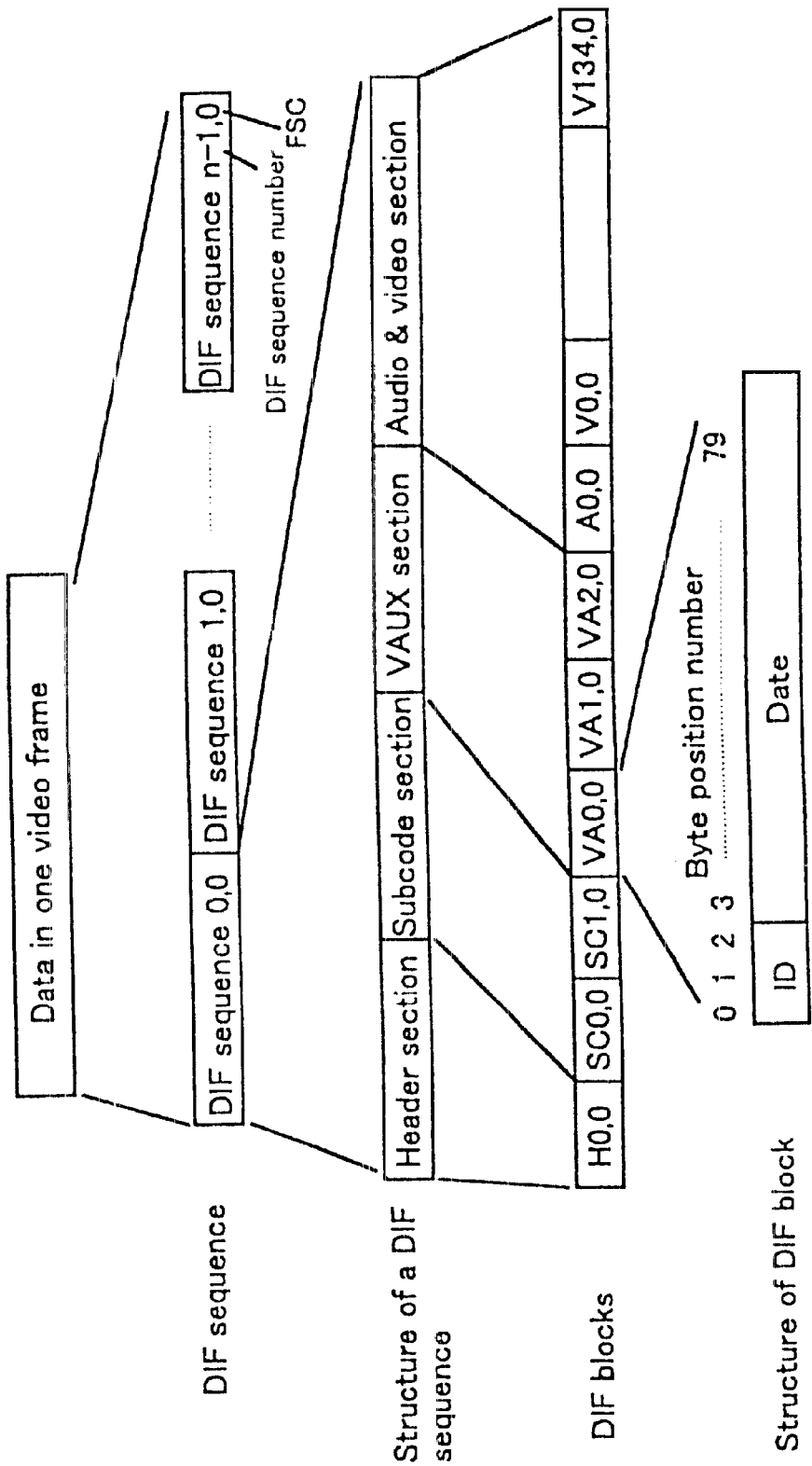
FIG. 10 depicts an interface format of a compressed signal.

FIG. 9 is a block diagram depicting the recording and reproducing apparatus used in the second exemplary embodiment. In FIG. 9, the input terminal 34 receives compressed video signals restored from transmission signals which has been given in the form of SDTI and undergone a predetermined process. These compressed signals carry a signal format shown in FIG. 10, and has the same structure as that of the compressed signal in DV format disclosed in the consumer-use digital VCR that HD Digital VCR Conference established. The compressed signal is formed in a hierarchic structure as shown in FIG. 10. The one video frame on the highest level is divided into DIF sequences.

The DIF sequence in FIG. 10 consists of data accommodated in one track on the tape, therefore, in the system of 525 scanning lines, data accommodated in one frame consists of ten DIF sequences, i.e., DIF sequence 0,0–DIF sequence 9,0.

One DIF sequence is further divided into Header section, Sub-code section, VAUX section and Audio & Video section as shown in FIG. 10. Further, each section is divided into DIF blocks in the unit of SYNC BLOCK that is a basic unit for tape recording. Namely, each section is divided as follows;

Header section: H0, 0 (one DIF block)
Sub-code section: SC0, 0 and SC1, 0 (two DIF blocks)
VAUX section: VAUX0, 0 VAUX1, 0 and VAUX2, 0 (three DIF blocks)
Audio & Video Section: A0, 0 V0, 0 to V134, 0 (nine Audio DIF blocks, and 135 Video DIF blocks)

The SOURCE PACKs in FIG. 10 and FIG. 8 are not identical, but there may be re-writing, deletion and addition.

Each DIF block corresponds to SYNC block of the recorded signals on the tape, and consists of 80 bytes, i.e., ID section (3 bytes) and Data section (77 bytes).

Figure 12:
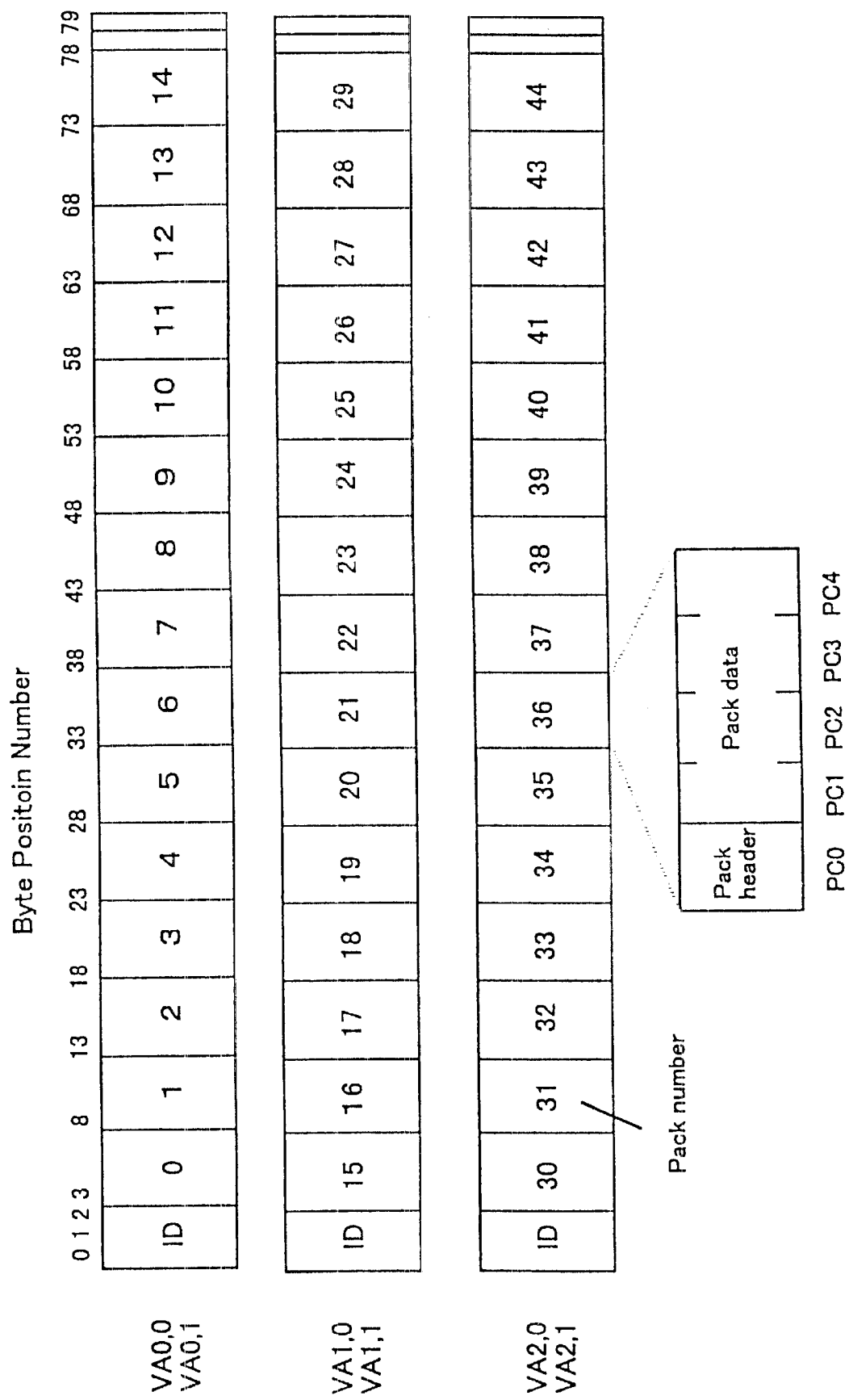
FIG. 12 depicts a structure of VAUX section of the compressed interface.

The format recognizing information is included in VAUX section of a compressed signal form shown in FIG. 10. The VAUX section in FIG. 10 has three DIF BLOCKS per frame as described above. FIG. 12 depicts an inside structure of VAUX. As shown in FIG. 12, a data called PACK of which one unit is 5 bytes (8 bits=1 byte), is recorded in total 15 PACKs in one DIF BLOCK. The VAUX can, therefore, transmit 45 PACKs in total per one frame.

The PACK comprises 5 bytes, i.e., PC0 that takes 1 byte and is a Pack header for identifying a kind of PACK, and Pack data (control information) ranging from PC1 to PC4 that take 4 bytes.

FIG. 11 depicts a structure of SOURCE PACK including the format recognizing information. The SOURCE PACK carries a field frequency of the video signal, and color frame information in addition to the format information.

The SOURCE PACK as shown in FIG. 11 is inserted into the VAUX shown in FIG. 12, and transmitted together with compressed signals.

The format information is inserted in STYPE section of PC3 of the SOURCE PACK shown in FIG. 11, and transmitted.

In FIG. 9, the compressed format recognition means 31 detects the SOURCE PACK from VAUX section one of compressed video signals, and recognizes a format of the video signal automatically. Rearrangement means 32 rearranges the sequence of the compressed signal format shown in FIG. 10 in the unit of SYNC BLOCK in accordance with the sequence of the tape format shown in FIGS. 5 and 6, thereby converting into a signal 36.

In other words, the compressed signal format shown in FIG. 10 carries a sub-code BLOCK and a VAUX BLOCK before a VIDEO BLOCK, and repeated strings of 15 VIDEO BLOCKs followed by an AUDIO BLOCK. This sequence is rearranged to the sequence of tape format shown in FIG. 5, i.e., the sequence of AUDIO, VIDEO, and Sub-code. The VAUX sections are inserted into SYNC #19, 20 and 156 in the VIDEO BLOCK as shown in FIG. 6. Recording means 37 adds an error correcting code, records channel coding, inserts a stuffing bit, etc., to the rearranged signal 36, whereby the signal 36 can be recorded on the tape as a record signal of 84 Mbps. As a result, the SOURCE PACK included in VAUX of FIG. 10 is converted into the SOURCE PACK shown in FIG. 8 and recorded on the tape.

Figure 13:
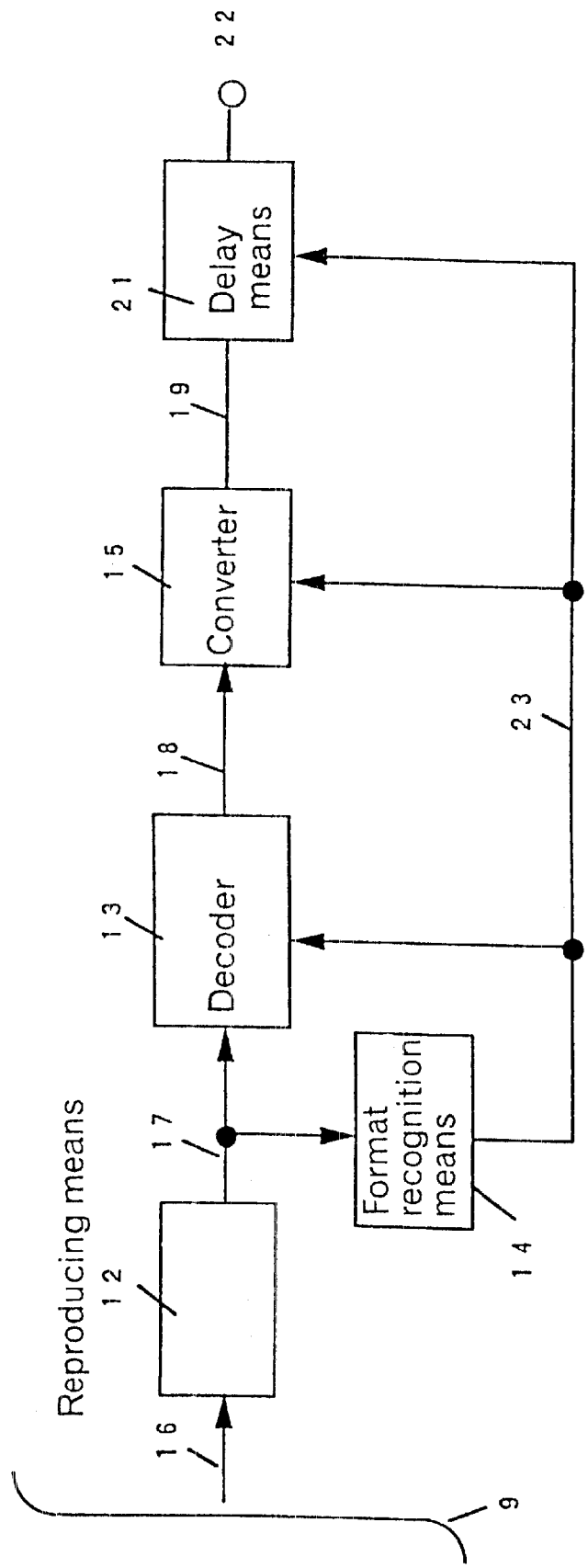
FIG. 13 is a block diagram depicting a recording and reproducing apparatus used in the third exemplary embodiment.

FIG. 13 is a block diagram depicting the recording and reproducing apparatus used in the third exemplary embodiment. On the magnetic tape 9, video signals in 4:2:2-i format and 4:2:0p format are sequentially recorded as shown in FIG. 4 with the same bit rate, i.e., 84 Mbps. Information that shows a kind of video signal is also recorded on the tape 9. A format of the recorded recognition signal was already described in the first exemplary embodiment.

Figure 21:
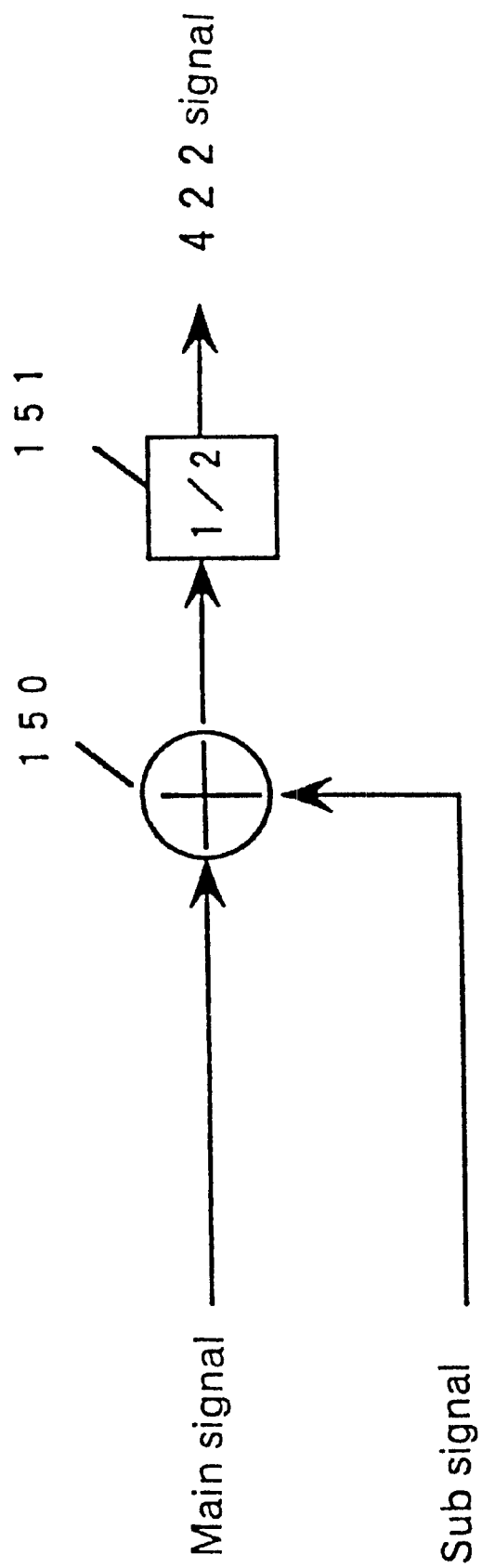
FIG. 21 is a block diagram depicting an example of a method of converting scanning lines of the recording and reproducing apparatus used in a conventional case.

Reproducing means 12 provides a reproduced signal 16 with a reproduction process including demodulation, error correction, etc. Then, decoder 13 provides the signal 16 with a decoding process including an inverse quantization, inverse DCT, deshuffling, and deblocking. Reproduced format recognition means 14 recognizes a format of the video signal automatically, and outputs a format recognition signal 23. When the compressed 4:2:0p signal is reproduced first, the decoder 13 instantly switches a decompression rate by using the format recognition signal 23, then decodes and outputs the 4:2:0p signal. A converter 15 converts a number of scanning lines of the decoded 4:2:0p signal 18 (progressive signal), which thereby converts 4:2:0-p signal 18 into 4:2:2-i signal 19 (interlace signal), which is then fed into delay means 21, where the signal 19 is given a predetermined delay time depending on a type of format recognition signal 23, and the signal 19 is sent to an output terminal 22. Regarding the scanning line conversion method through which a progressive signal is converted into an interlace signal, the filter shown in FIG. 21 is used, which has the simplest structure.

On the other hand, when a 4:2:2-i signal is reproduced first from the magnetic tape, the decoder 13 instantly switches the decompression rate of the video signals by using the format recognition signal 23 obtained through the reproduced format recognition means 14, and decodes the 4:2:2-i signal. The decoded 4:2:2-i signal 18 is fed into the delay means 21 through the converter 15. The delay means 21 provides the signal 18 with a predetermined delay time depending on a type of the format recognition signal 23. Total delay time given by the decoder 13, converter 15 and delay means 21 can be identical even if signal of any format are entered, whereby the 4:2:2-i signal decoded from the 4:2:0p signal and another 4:2:2-i signal directly reproduced are sent to the output terminal 22 sequentially without any seams.

The above paragraphs discussed the reproducing and decoding of the 4:2:0p signal as well as 4:2:2-i signal sequentially, and the outputting of them as 4:2:2-i signal. When the 4:2:0p output signal is required, on the other hand, the 4:2:0p signal simply travels through the converter 15, and the 4:2:2-i signal is converted to the 4:2:0p signal.

Figure 14:
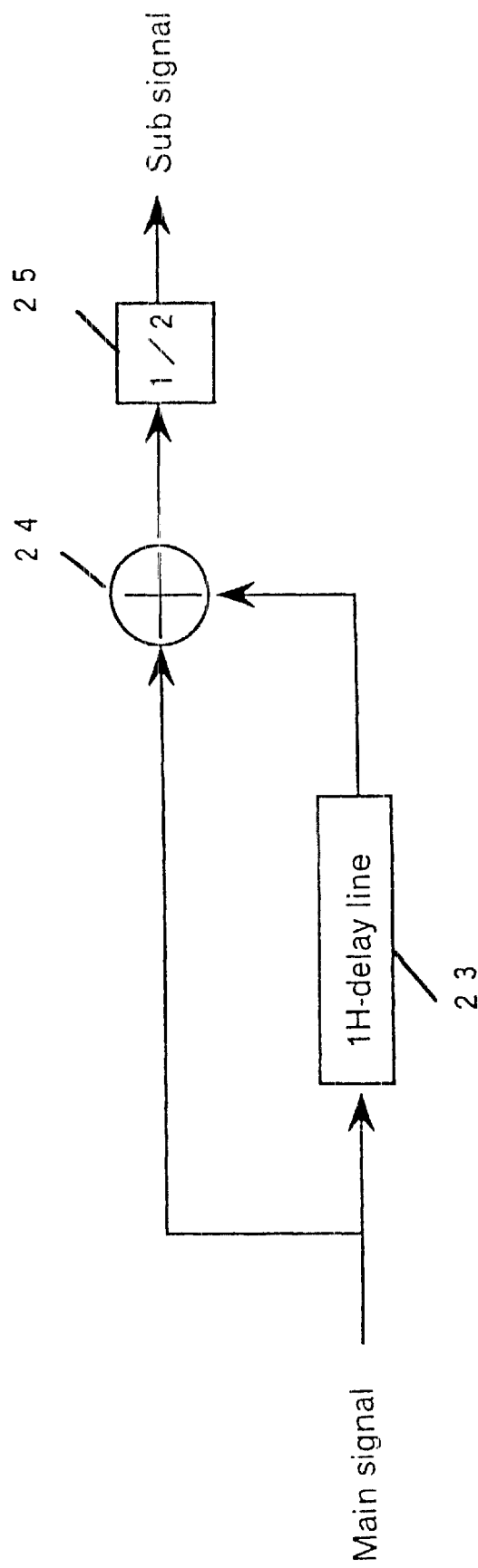
FIG. 14 is a block diagram depicting an example of a method of converting scanning lines of the recording and reproducing apparatus of the present invention.
Figure 15:
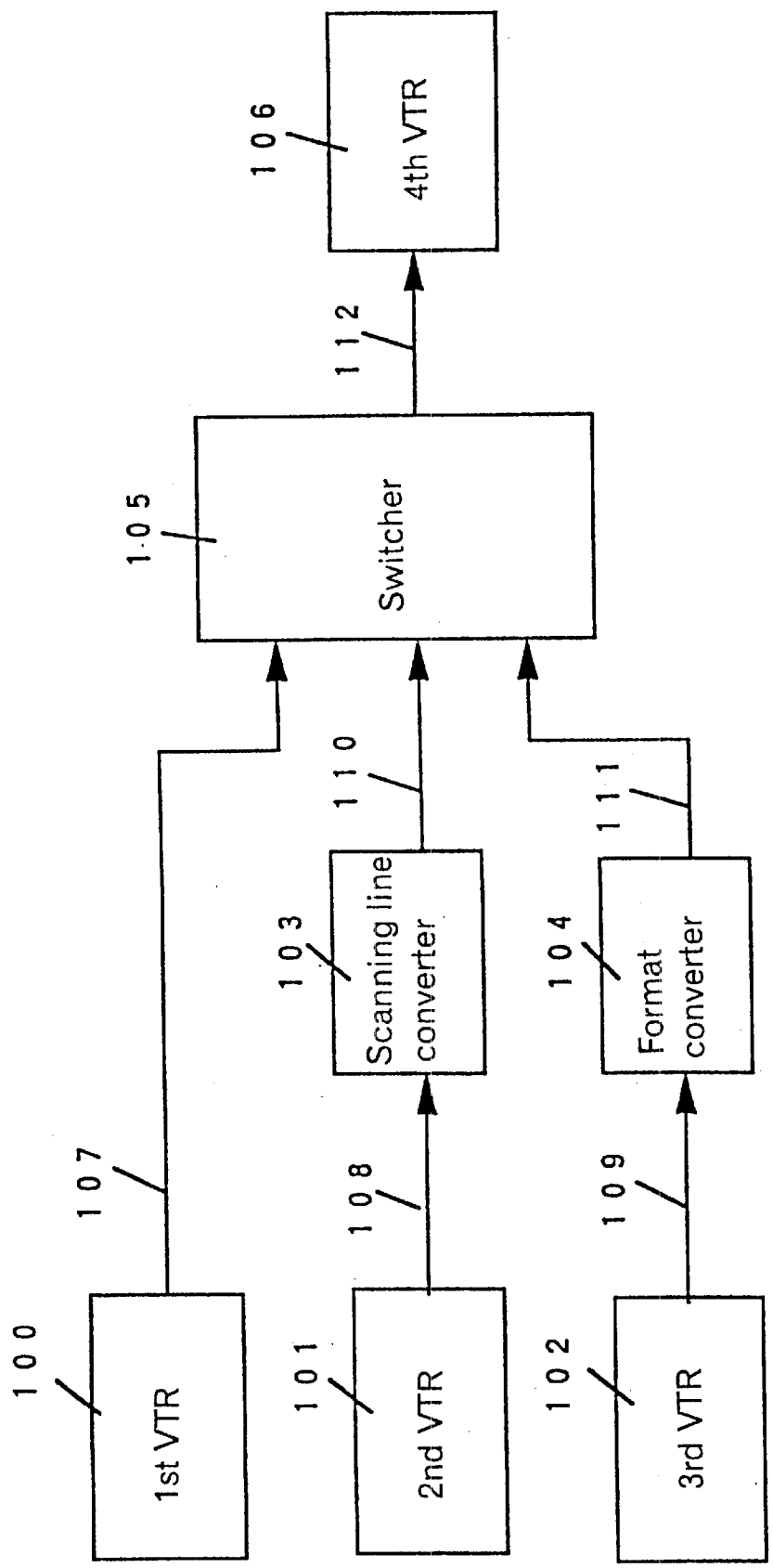
FIG. 15 is a block diagram depicting a conventional recording and reproducing apparatus.
Figure 16:
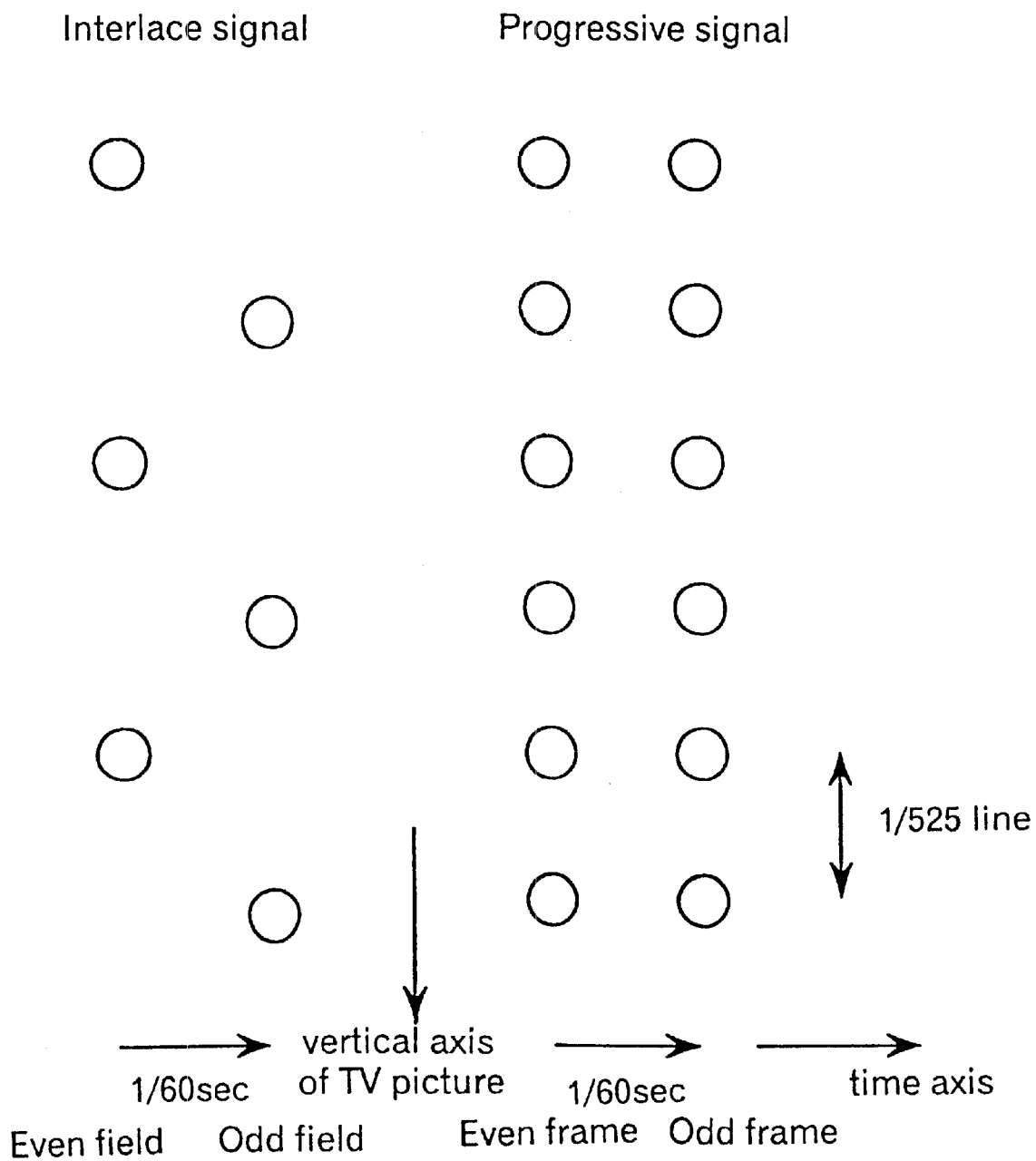
FIG. 16 depicts a difference between progressive signals and interlace signals.
Figure 17:
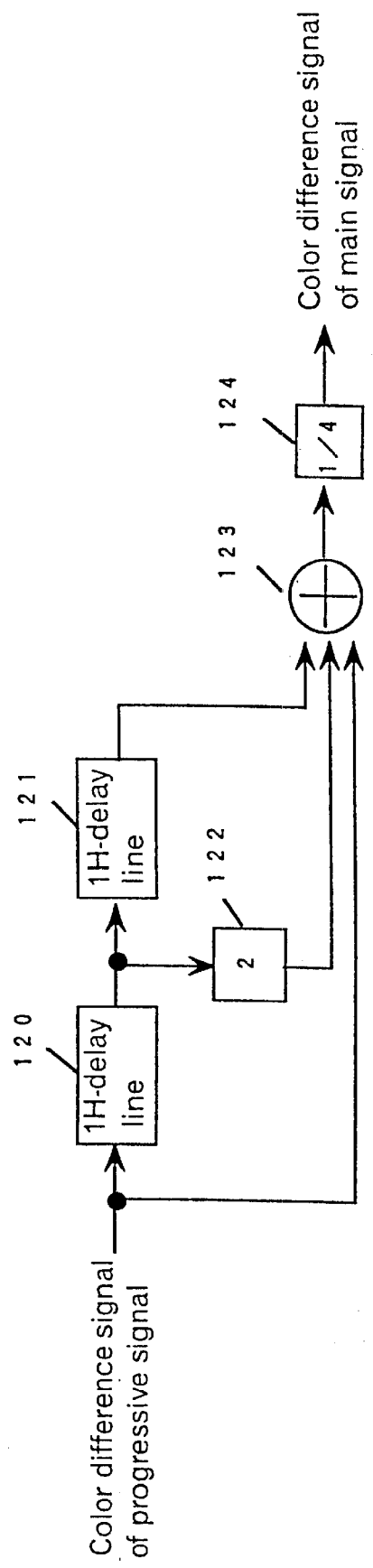
FIG. 17 depicts a structure of a conventional pre-filter limiting a frequency bandwidth of a color difference signal.
Figure 18:
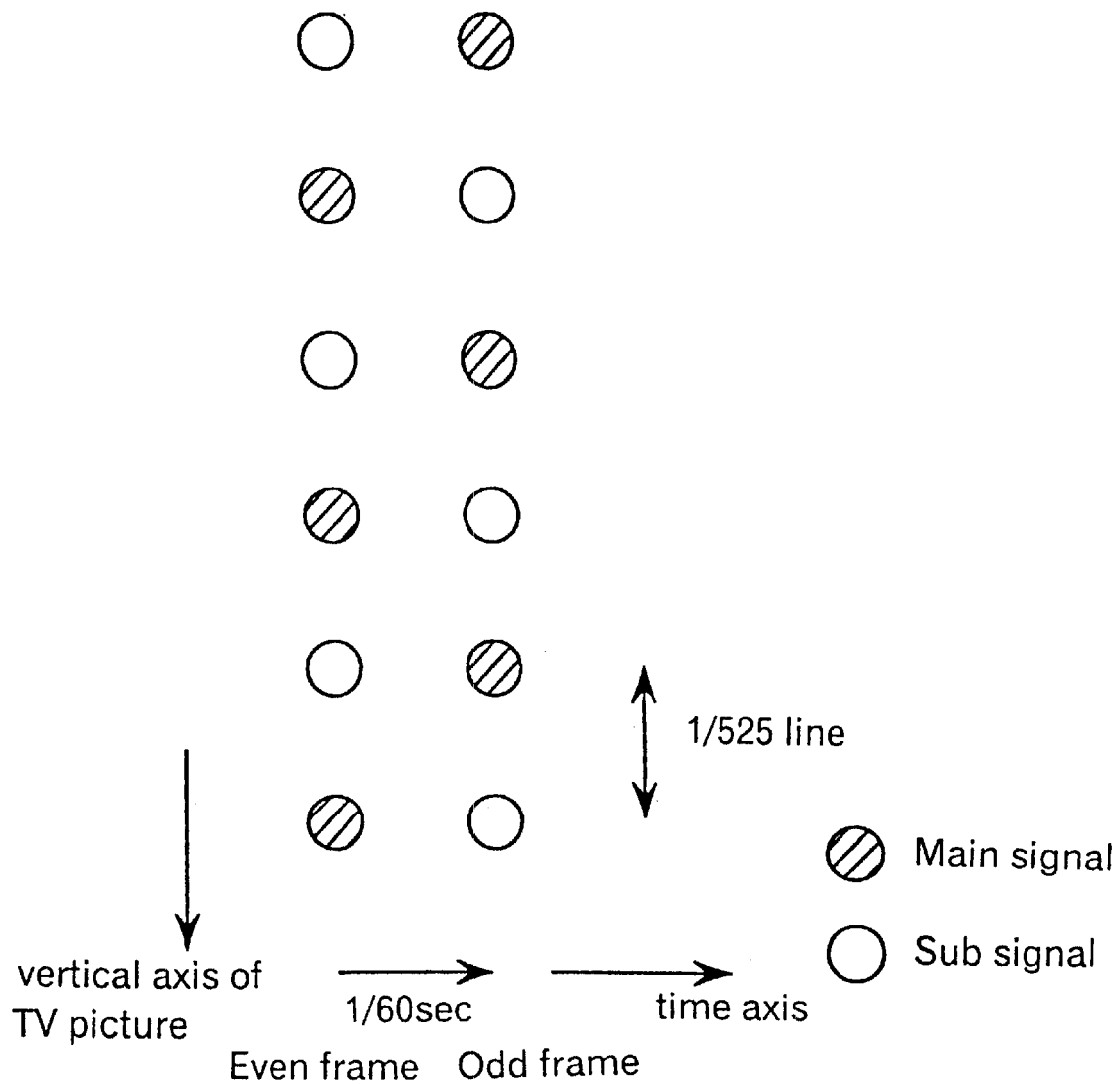
FIG. 18 depicts a temporal-spatial relation between main signals and sub signals of sequential scanning signals used in a conventional case.
Figure 19:
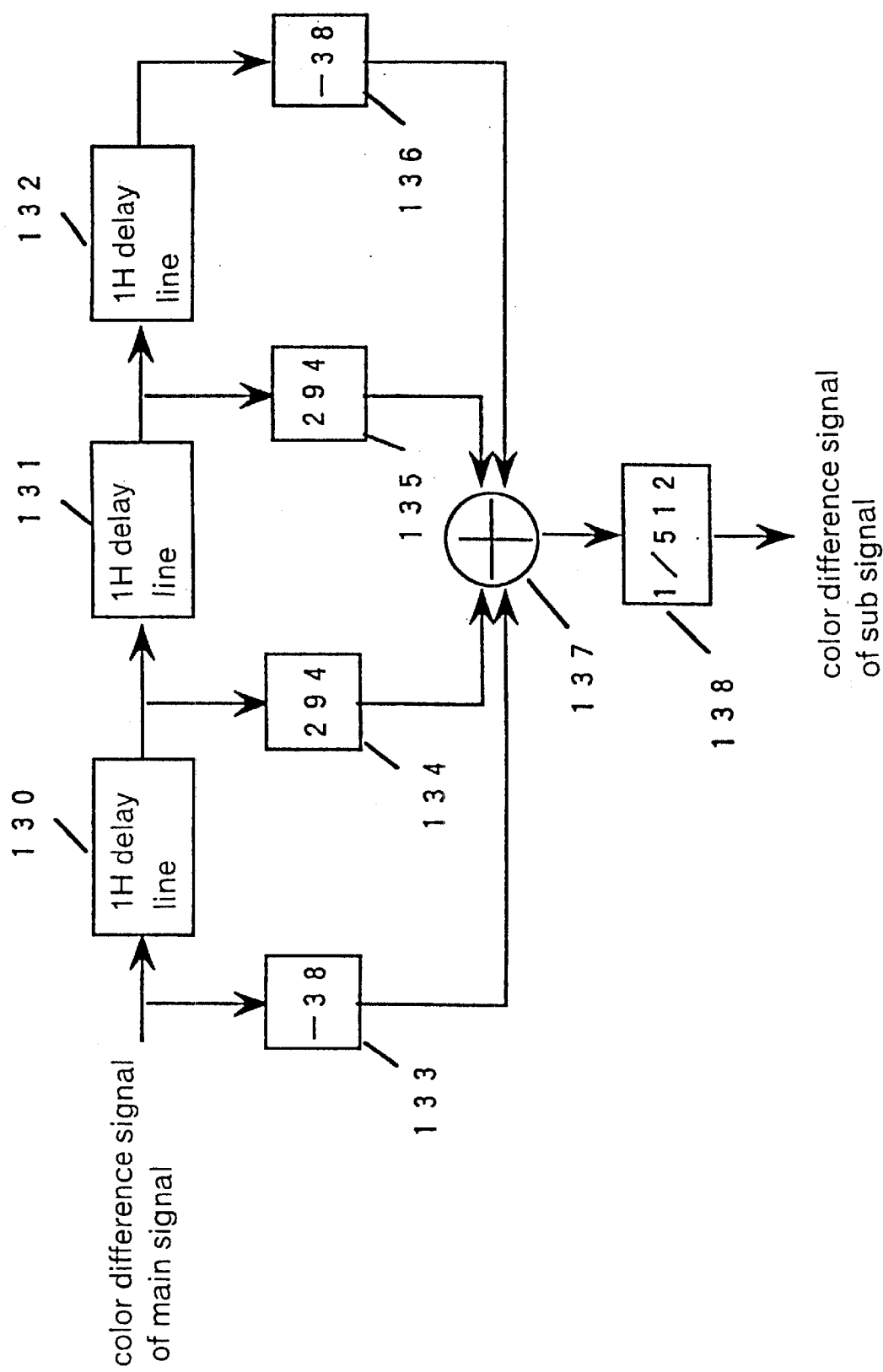
FIG. 19 is a block diagram depicting a structure of interpolating filter of a color difference signal used in a conventional case.
Figure 20:
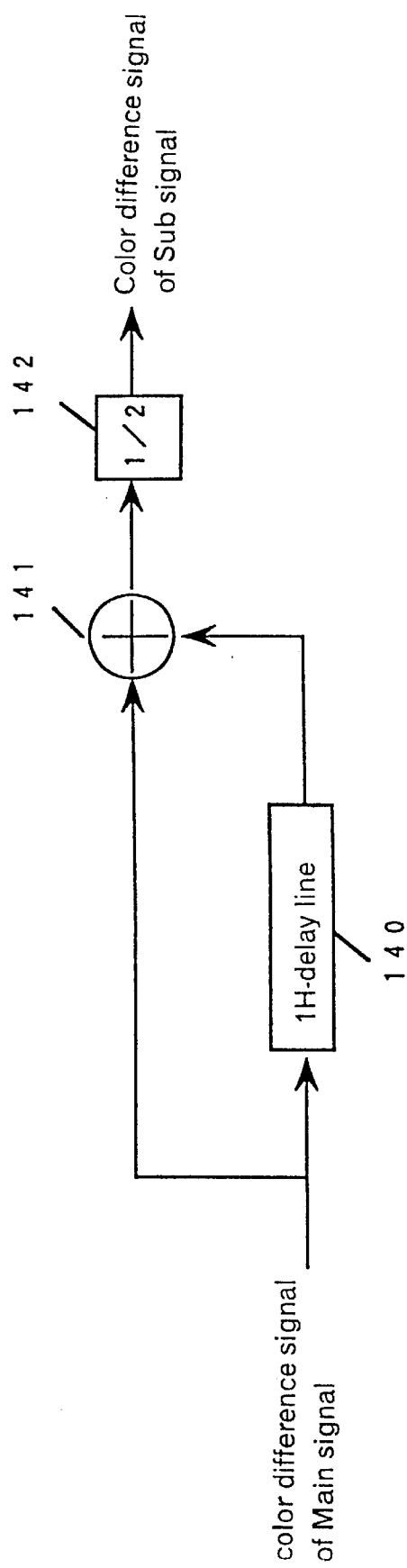
FIG. 20 is a block diagram depicting a structure of interpolating filter of a color difference signal used in a conventional case.

Regarding the scanning line conversion method through which interlace signals are converted into progressive signals, a sub-signal is produced from the 4:2:2-i main signal through an interpolation process as shown in FIG. 14, which is the simplest way to realize the conversion. In FIG. 14, the 1H delay line 23 delay main signal for one horizontal scanning period, and an adder 24 as well as a multiplier 25 constitute a filter. A number in the box representing the multiplier 25 shows a coefficient of multiplication. The filter shown in FIG. 14 is actually not practical because it produces a difference in the frequency characteristics between a main signal and a sub signal. A filter with more taps is utilized in a practical case.

In the recording and reproducing apparatus used in this exemplary embodiment, as shown in FIG. 4 for instance, when signals with different numbers of scanning lines or resolutions, such as 4:2:2-i signals and 4:2:0p signals, are recorded on a magnetic tape sequentially with no seams, the 4:2:2-i signals (interlace signals) or 4:2:0p signals (progressive signals) can be sequentially sent to the output terminal without any seams.

In other words, if signals of different formats are recorded sequentially on the magnetic tape, they can be handled as if they were recorded in the same format, and the output video signals thereby do not produce any distortions or seams.

When 4:2:2-i signals and 4:2:0p signals are successively recorded on a magnetic tape, this exemplary embodiment describes that either consecutive 4:2:2-i signals or consecutive 4:2:0p signals are supplied. However, a format of output signals is not limited to the format recorded on the magnetic tape, but signals can be converted into another format before being tapped off.

For instance, when 1080i signals and 720p signals are successively recorded on a magnetic tape, all the signals can be converted into 480p signals before being tapped off.

In this exemplary embodiment, one type of decoder is used for switching the decompression rate instantly by using the format recognition signal of the video signals recorded on the magnetic tape; however, it can be also practical to use a various of decoders for decoding, and then to select video signals to be sent to the output terminal by using the format recognition signal. Furthermore, the 4:2:0p signals and 4:2:2-i signals are sequentially recorded on the magnetic tape; however, it is not limited to the above combination, but also other combinations such as HD signals and 4:2:2-i signals, HD signals and 4:2:0p signals, 4:2:2-i signals and 4:1:1-i signals, or 4:2:2-i signals and 4:2:0-i signals also produces the same effect.

In these exemplary embodiments, the DVCPRO format in a digital VCR is taken for an example; however, the descriptions can be applicable not only to other digital VCRs, but also to optical discs, hard discs and the likes.

What is claimed is:

1. A video-signal-recording apparatus comprising:
   (a) input means for inputtting a least two video signals having different video formats,
   (b) input format recognition means for recognizing the video formats of input signals, and outputting a format recognition signal,
   (c) compression means for compressing the video signals into not more than a predetermined recording bit rate, said compression means having a plurality of compression rates and changing the compression rates instantly responsive to the format recognition signal,
   (d) record means for compounding the output of the compression means and the format recognition signal, producing a recording signal of a predetermined bit rate, and recording said recording signal on a recording medium, and
   (e) delay means for giving a delay time to an output of said compression means, said delay time being changed depending on the format recognition signal,
   wherein two or more video signals compressed from different video formats are recorded on the recording medium sequentially in a seam-free manner.

2. The video-signal-recording apparatus as defined in claim 1, wherein the video signals are recorded sequentially on one or more helical tracks formed on a magnetic tape.

3. The video-signal-recording apparatus as defined in claim 1, wherein the video format of the video signals received by the input means is one of 480i, 480p, 1080i, 1080p and 720p.

4. The video-signal-recording apparatus as defined in claim 1, wherein the video format of the video signals received by the input means are at least two of "4:1:1 signal", "4:2:0 signal", "4:2:2 signal", "4:2:0p" signal, and "4:2:2p" signal.

5. The video-signal-recording apparatus as defined in claim 1, wherein the input format recognition means detects a control packet inserted in a blanking period of the video signal received through a digital interface, and recognizes the format of the video signal automatically by using the format recognition signal included in the control packet.

6. The video-signal-recording apparatus as defined in claim 1, wherein the input-format-recognition-means measures one of a frequency, a horizontal blanking period, and a vertical blanking period of a video signal given through a digital interface to the input means, thereby recognizes automatically a format of the video signal.

7. A video-signal-recording apparatus comprising:
   (a) input means for inputting a least two video signals having different video formats,
   (b) input format recognition means for recognizing the video formats of input signals, and outputting a format recognition signal,
   (c) compression means for compressing the video signals into not more than a predetermined recording bit rate, said compression means having a plurality of compression rates and changing the compression rates instantly responsive to the format recognition signal, and
   (d) record means for compounding the output of the compression means and the format recognition signal, producing a recording signal of a predetermined bit rate, and recording said recording signal on a recording medium,
   wherein said two or more video signals compressed from different video formats are recorded on the recording medium sequentially in a seam-free manner, and
   wherein said format recognition signal is inserted in control information comprising a string of five-byte units including one byte for header section followed by four bytes for information section, and is recorded on a predetermined place of a magnetic tape.

8. A video-signal-recording apparatus comprising:
   (a) input means for inputting a least two video signals compressed form different video formats,
   (b) compressed format recognition means for recognizing the video formats of input signals, and outputting a format recognition signal, wherein said compressed format recognition means recognizes formats of the video signals automatically by using a format recognition signal included in control information that is transmitted as an insertion in the compressed video signals, said control information comprising a string of five-byte units including one byte for header section followed by four bytes for information section,
   (c) video signal rearrangement means for rearranging compressed video signals into a predetermined order in a predetermined unit in order to record the signals on a magnetic tape,
   (d) record means for compounding the output of the video signal rearrangement means and the format recognition signal, producing a recording signal of a predetermined bit rate, and recording said recording signal on a recording medium,
   wherein at least two video signals compressed from different video formats are recorded on the recording medium sequentially in a seam-free manner.

9. The video-signal-recording apparatus as defined in claim 8, wherein video signals are recorded sequentially on one or more helical tracks formed on a magnetic tape.

10. The video-signal-recording apparatus as defined in claim 8, wherein the video formats of the video signal received by the input means is one of 480i, 480p, 1080i, 1080p and 720p.

11. The video-signal-recording apparatus as defined in claim 8, wherein the video format received by the input means are at least two of "4:1:1 signal", "4:2:0 signal", "4:2:2 signal", "4:2:0p signal" and "4:2:2p" signal.

12. A video-signal-recording apparatus comprising:
    (a) input means for inputting a least two video signals compressed from different video formats, (b) compressed format recognition means for recognizing the video formats of input signals, and outputting a format recognition signal, (c) video signal rearrangement means for rearranging compressed video signals into a predetermined order in a predetermined unit in order to record the signals on a magnetic tape, and (d) record means for compounding the output of the video signal rearrangement means and the format recognition signal, producing a recording signal of a predetermined bit rate, and recording said recording signal on a recording medium, wherein at least two video signals compressed from different video formats are recorded on the recording medium sequentially in a seam-free manner, and wherein said format recognition signal is inserted in control information comprising a string of five-byte units including one byte for header section followed by four bytes for information section, and is recorded on a predetermined place of the magnetic tape.

13. A video-signal-reproducing apparatus for reproducing video signals from a recorded medium where the video signals of a least two different video formats having been compressed with different compression rates are recorded together with format recognition signals with a predetermined recording bit rate, said video-signal-reproducing apparatus comprising:

(a) reproduction means for reproducing signals from the recorded medium, (b) selection means for selecting and outputting a compressed video signal and format recognition signal from an output of said reproduction means, and (c) decompression means for decompressing compressed video signal and outputting the decompressed signal, said decompressed means having a plurality of decompression rates and changing the decompression rates instantly responsive to the format recognition signal, and (d) delay means for giving a delay time to the decompressed video signal, wherein said delay time is changed depending on said format recognition signal, wherein at least two video signals, which have been compressed from different formats and recorded sequentially, are played back sequentially in a seam-free manner.

14. The video-signal-reproducing apparatus as defined in claim 13, wherein the video signals, which have been recorded sequentially on one or more helical tracks that are formed on a magnetic tape, are played back sequentially in a seam-free manner.

15. The video-signal-reproducing apparatus as defined in claim 13 further comprising format conversion means for converting the decompressed video signal into a different video format, wherein said format conversion means reproduces a plurality of video signals that have been decompressed from different formats and recorded, and outputs the reproduced video signals in a predetermined output format sequentially in a seam-free manner.

16. The video-signal-reproducing apparatus as defined in claim 15, wherein said format conversion means at least converts 480i into 480p.

17. The video-signal-reproducing apparatus as defined in claim 15, wherein said format conversion means at least converts 480p into 480i.

18. The video-signal-reproducing apparatus as defined in claim 15, wherein said format conversion means at least converts 720p into 480p.

19. The video-signal-reproducing apparatus as defined in claim 15, wherein said format conversion means at least converts 480p into 720p.

20. The video-signal-reproducing apparatus as defined in claim 15, wherein said format conversion means at least converts 1080i into 480p.

21. The video-signal-reproducing apparatus as defined in claim 15, wherein said format conversion means at least converts 480p into 1080i.

22. The video-signal-reproducing apparatus as defined in claim 15, wherein said format conversion means at least converts 1080p into 720p.

23. The video-signal-reproducing apparatus as defined in claim 15, wherein said format conversion means at least converts 720p into 1080p.

24. The video-signal-reproducing apparatus as defined in claim 15, wherein said format conversion means at least converts 1080i into 720p.

25. The video-signal-reproducing apparatus as defined in claim 15, wherein said format conversion means at least converts 720p into 1080i.

26. The video-signal-reproducing apparatus as defined in claim 15, wherein said format conversion means at least converts 1080p into 1080i.

27. The video-signal-reproducing apparatus as defined in claim 15, wherein said format conversion means at least converts 1080i into 1080p.

28. The video-signal-reproducing apparatus as defined in claim 15, wherein said format conversion means at least converts 1080i into 480i.

29. The video-signal-reproducing apparatus as defined in claim 15, wherein said format conversion means at least converts 480i into 1080i.

30. The video-signal-reproducing apparatus as defined in claim 15, wherein said format conversion means at least converts 720p into 480i.

31. The video-signal-reproducing apparatus as defined in claim 15, wherein said format conversion means at least converts 480i into 720p.

32. The video-signal-reproducing apparatus as defined in claim 15, wherein said format conversion means at least converts 1080p into 480p.

33. The video-signal-reproducing apparatus as defined in claim 15, wherein said format conversion means at least converts 480p into 1080p.

34. The video-signal-reproducing apparatus as defined in claim 15, wherein said format conversion means at least converts 1080p into 480i.

35. The video-signal-reproducing apparatus as defined in claim 15, wherein said format conversion means at least converts 480i into 1080p.

36. The video-signal-reproducing apparatus as defined in claim 15, wherein said format conversion means at least converts "4:1:1 signal" into "4:2:2 signal".

37. The video-signal-reproducing apparatus as defined in claim 15, wherein said format conversion means at least converts "4:2:2 signal" into "4:2:0p signal" and "4:2:2p signal".

38. The video-signal-reproducing apparatus as defined in claim 15, wherein said format conversion means at least converts "4:2:2p signal" into "4:2:2 signal".

39. The video-signal-reproducing apparatus as defined in claim 15, wherein said format conversion means at least converts "4:2:2p signal" into "4:2:2 signal".

* * * * *

UNITED STATES PATENT AND TRADEMARK OFFICE
CERTIFICATE OF CORRECTION

PATENT NO.    : 6,501,904 B1
DATED         : December 31, 2002
INVENTOR(S)   : Tokuji Kuroda et al.

It is certified that error appears in the above-identified patent and that said Letters Patent is hereby corrected as shown below:

Column 11,
Line 26, delete "inputtting a" and insert -- inputting at --

Column 12,
Lines 6, 29 and 66, delete "a" and insert -- at --
Line 30, delete "form" and insert -- from --

Column 13,
Line 23, delete "a" and insert -- at --

Signed and Sealed this

Fifteenth Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,501,904 B1
DATED : December 31, 2002
INVENTOR(S) : Tokuji Kuroda et al.

It is certified that error appears in the above-identified patent and that said Letters Patent is hereby corrected as shown below:

Title page,
Item [75], Inventors, delete "Ibaraki" and insert -- Osaka --
delete "Sakai" and insert -- Osaka --

Column 11,
Line 26, delete "inputtting a" and insert -- inputting at --

Column 12,
Line 6, delete "a" insert -- at --
Lines 29 and 66, delete "a" and insert -- at --
Line 30, delete "form" and insert -- from --

Column 13,
Line 23, delete "a" and insert -- at --

Signed and Sealed this

Eighth Day of February, 2005

JON W. DUDAS
*Director of the United States Patent and Trademark Office*